US007066669B2

(12) United States Patent
Lugg (10) Patent No.: US 7,066,669 B2
(45) Date of Patent: Jun. 27, 2006

(54) METHOD OF CREATING AN IMAGE REPLACEMENT DOCUMENT FOR USE IN A CHECK TRUNCATION ENVIRONMENT AND AN APPARATUS THEREFOR

(75) Inventor: Richard P. Lugg, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/929,257

(22) Filed: Aug. 30, 2004

(65) Prior Publication Data

US 2006/0045600 A1    Mar. 2, 2006

(51) Int. Cl.
 *B41J 13/00* (2006.01)
 *G06F 17/60* (2006.01)
 *G06K 9/00* (2006.01)

(52) U.S. Cl. .................. 400/578; 705/42; 382/137
(58) Field of Classification Search ............... 400/578; 382/137; 235/379, 380; 705/78, 42, 30
See application file for complete search history.

(56) References Cited

U.S. PATENT DOCUMENTS

| | | | | |
|---|---|---|---|---|
| 4,128,202 A | * | 12/1978 | Buros | 235/493 |
| 4,482,058 A | * | 11/1984 | Steiner | 209/534 |
| 4,517,268 A | * | 5/1985 | Gruber et al. | 430/39 |
| 4,672,377 A | * | 6/1987 | Murphy et al. | 340/5.41 |
| 4,901,114 A | * | 2/1990 | Parker et al. | 399/232 |
| 5,193,121 A | * | 3/1993 | Elischer et al. | 382/138 |
| 5,371,798 A | * | 12/1994 | McWhorter | 380/51 |
| 5,540,338 A | * | 7/1996 | Stevens et al. | 209/534 |
| 5,545,885 A | * | 8/1996 | Jagielinski | 235/449 |
| 5,590,196 A | * | 12/1996 | Moreau | 705/78 |
| 5,652,802 A | * | 7/1997 | Graves et al. | 382/135 |
| 5,689,578 A | * | 11/1997 | Yamauchi et al. | 385/123 |
| 5,720,012 A | * | 2/1998 | McVeigh et al. | 358/1.14 |

(Continued)

OTHER PUBLICATIONS

American National Standards Institute, X9.100-140 Specifications for an Image Document—IRD, 2004.*

(Continued)

*Primary Examiner*—Ren Yan
*Assistant Examiner*—Wasseem H. Hamdan
(74) *Attorney, Agent, or Firm*—Michael Chan (57) ABSTRACT

A method of creating an image replacement document (IRD) during two passes of a sheet material through a printing apparatus including building a first print file portion based upon IRD data, building a second print file portion based upon IRD data, printing with non-magnetic ink onto the sheet material at least some information based upon the first print file portion to create a front portion of the IRD during a first pass of the sheet material through the printing apparatus, printing with non-magnetic ink onto the sheet material a machine-readable code which is associated with a magnetic ink character recognition (MICR) codeline to be encoded onto the IRD, printing with non-magnetic ink onto the sheet material at least some information based upon the second print file portion to create a back portion of the IRD during the first pass of the sheet material through the printing apparatus, and printing with magnetic ink onto the sheet material the MICR codeline based upon the machine-readable code which has been printed on the sheet material to print an encoded MICR codeline during a second pass of the sheet material through the printing apparatus.

8 Claims, 7 Drawing Sheets

U.S. PATENT DOCUMENTS

| | | | |
|---|---|---|---|
| 5,801,366 A * | 9/1998 | Funk et al. | 235/380 |
| 6,233,340 B1 * | 5/2001 | Sandru | 380/51 |
| 6,236,816 B1 * | 5/2001 | Warbus et al. | 399/46 |
| 6,290,129 B1 * | 9/2001 | Momose | 235/449 |
| 6,764,015 B1 * | 7/2004 | Pearson | 235/487 |
| 2001/0045452 A1 * | 11/2001 | Momose et al. | 235/379 |
| 2002/0154807 A1 * | 10/2002 | Jones et al. | 382/135 |
| 2003/0202690 A1 * | 10/2003 | Jones et al. | 382/139 |
| 2003/0219122 A1 * | 11/2003 | Ramirez et al. | 380/54 |
| 2004/0213636 A1 * | 10/2004 | Chiu | 400/76 |
| 2005/0015317 A1 * | 1/2005 | Rodriguez et al. | 705/30 |
| 2005/0033685 A1 * | 2/2005 | Reyes | 705/39 |

OTHER PUBLICATIONS

Bill Lange, Combining Remote Capture and IRD Printing, First Edition Aug. 2005.*

The Federal Reserve Board, Consumer Guide to Check 21 and Substitute Checks, last update, Feb. 16, 2004.*

The Federal Reserve Board, Anatomy of a substitute check, 2004.*

Susan Kraus, Checks 21 Compliant Checks and Image File Size Requirements, Mar. 7, 2005.*

* cited by examiner

METHOD OF CREATING AN IMAGE REPLACEMENT DOCUMENT FOR USE IN A CHECK TRUNCATION ENVIRONMENT AND AN APPARATUS THEREFOR

BACKGROUND OF THE INVENTION

The present invention relates to image replacement documents, and is particularly directed to a method of creating an image replacement document for use in a check truncation environment and an apparatus therefor.

In a check truncation environment, an original check is not transferred between banks during the check clearing process. Instead, electronic image data which is representative of an image of an original check is transferred between the banks. When a paper version of the original check is needed, it may be printed on demand using the electronic image and related data which is representative of the original check. This paper version is called an image replacement document (IRD).

The creation of an IRD for use in a check truncation environment is defined by American National Standards Institute (ANSI) X9.90 standard. This standard defines the content of an IRD using the front and back images of an original check and data associated with the check. Currently, institutions having a need to print IRDs usually use some type of laser printer which uses ink with magnetic properties (i.e., magnetic ink). Magnetic ink is needed for printing the magnetic ink character recognition (MICR) codeline of the original check onto the IRD. In these known IRD printing applications, the entire IRD is printed with magnetic ink. Magnetic ink costs more than non-magnetic ink. Accordingly, a drawback in using magnetic ink to print the entire IRD is that there is a relatively higher material cost since more magnetic ink is used as compared to if only the MICR codeline of the IRD was printed with magnetic ink.

Also, using magnetic ink from a laser printer to print the MICR codeline of the IRD may result in increased numbers of rejected items and/or misread items when attempts are later made to read the MICR codeline of the IRD. The numbers of rejected items and/or misread items may increase due to residual magnetic ink which may be deposited on the IRD when the MICR codeline was printed using the laser printer. It would be desirable to avoid depositing residual ink as well as to reduce total cost associated with printing the MICR codeline and the information other than the MICR codeline when the IRD is created.

SUMMARY OF THE INVENTION

In accordance with one aspect of the present invention, a method of creating an image replacement document (IRD) during two passes of a sheet material through a printing apparatus comprises building a first print file portion based upon IRD data, building a second print file portion based upon IRD data, printing with non-magnetic ink onto the sheet material at least some information based upon the first print file portion to create a front portion of the IRD during a first pass of the sheet material through the printing apparatus, printing with non-magnetic ink onto the sheet material a machine-readable code which is associated with a magnetic ink character recognition (MICR) codeline to be encoded onto the IRD, printing with non-magnetic ink onto the sheet material at least some information based upon the second print file portion to create a back portion of the IRD during the first pass of the sheet material through the printing apparatus, and printing with magnetic ink onto the sheet material the MICR codeline based upon the machine-readable code which has been printed on the sheet material to print an encoded MICR codeline during a second pass of the sheet material through the printing apparatus. The encoded MICR codeline may be printed with magnetic ink onto the front portion of the IRD during the second pass of the sheet material through the printing apparatus. The machine-readable code may comprise a barcode. The IRD data may be received from an application external to the printing apparatus.

In accordance with another aspect of the present invention, a method of creating an image replacement document (IRD) for use in a check truncation environment comprises building a print file having a magnetic ink character recognition (MICR) portion and a non-MICR portion based upon IRD data, printing with non-magnetic ink a front portion of the IRD based upon the non-MICR portion of the print file, printing with non-magnetic ink a machine-readable code onto at least one of the front and back portions of the IRD, reading the machine-readable code from the at least one of the front and back portions of the IRD, and printing with magnetic ink an encoded MICR codeline onto at least one of the front and back portions of the IRD based upon the machine-readable code. The encoded MICR codeline may be printed with magnetic ink onto the front portion of the IRD. The machine-readable code may comprise a barcode. The method may further comprise printing with non-magnetic ink the back portion of the IRD based upon the non-MICR portion of the print file.

In accordance with yet another aspect of the present invention, an apparatus is provided for printing an image replacement document (IRD) onto a single sheet of material during two passes of the single sheet of material. The apparatus comprises a feeder for feeding the single sheet of material on which information is to be printed to provide the IRD. The apparatus further comprises means for building a print file having a magnetic ink character recognition (MICR) portion and a non-MICR portion based upon IRD data. The apparatus also comprises means for printing with non-magnetic ink onto a first portion of the single sheet of material at least some information including a machine-readable code based upon the non-MICR portion of the print file during first pass of the single sheet of material. The apparatus further comprises means for printing with magnetic ink onto a second portion of the single sheet of material at least some information based upon the non-MICR portion of the print file during a second pass of the single sheet of material. Preferably, the first portion of the single sheet of material and the second portion of the single sheet of material are on the front side of the IRD. The apparatus may further comprise means for printing with non-magnetic ink onto a third portion of the single sheet of material at least some information based upon the non-MICR portion of the print file during the first pass of the single sheet of material, wherein the third portion of the single sheet of material is on the back side of the IRD. The apparatus may further comprise means for receiving IRD data from an external application.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to method of creating an image replacement document (RD) for use in a check truncation environment and an apparatus therefor. The specific environment in which the IRD is used may vary. In the present application, the IRD is used in a check truncation environment. In a check truncation environment, an IRD is sometimes referred to as a substitute check. The American National Standards Institute (ANSI) X9.90 standard defines the content of IRDs in a check truncation environment.

Figure 1:
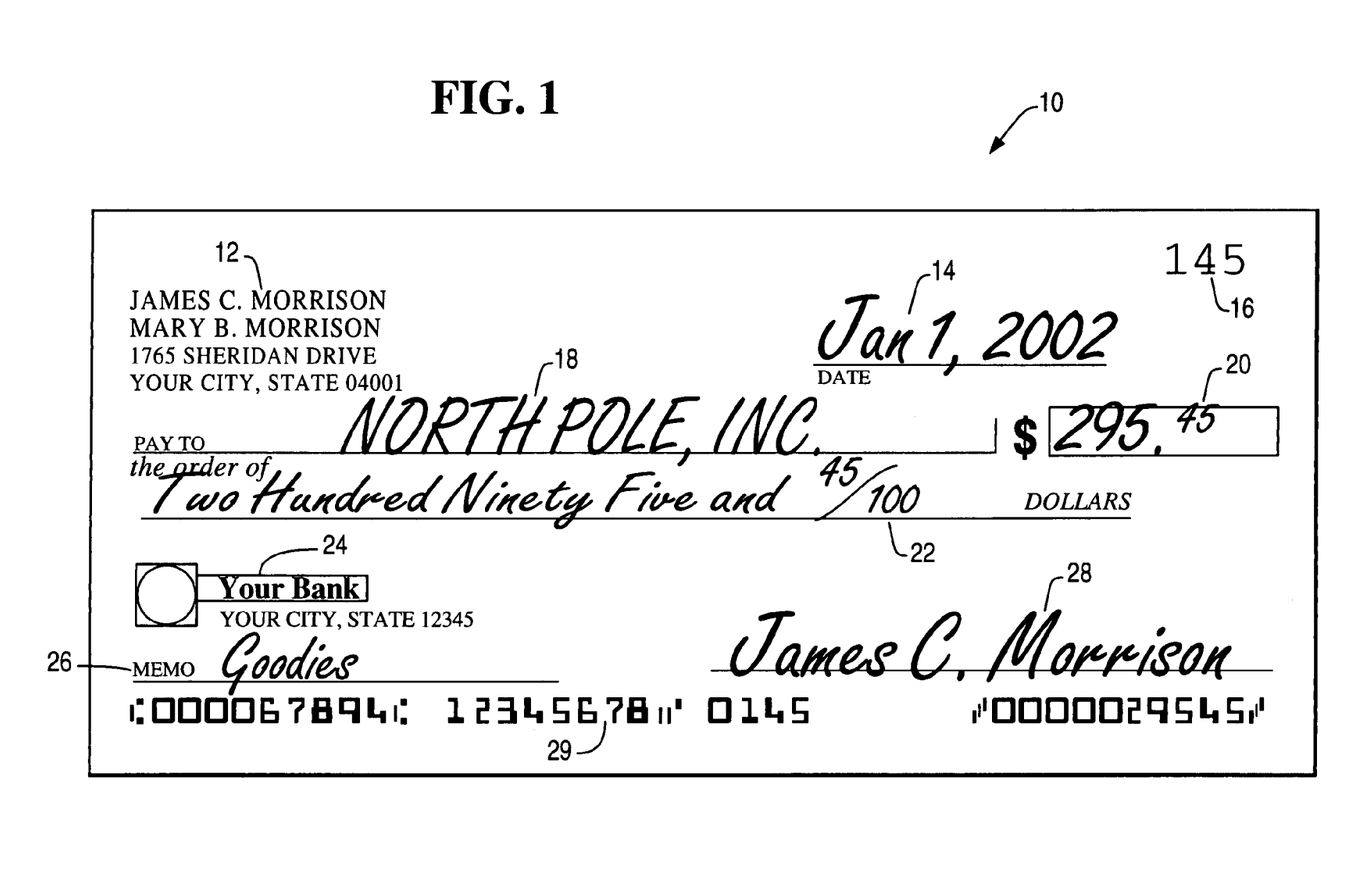
FIG. 1 is an illustration of the front side of a typical original check.

Different types of checks are processed in a check truncation environment. A physical personal check 10, as shown in FIG. 1, is one type of check which is processed. The check features shown in FIG. 1 include a payer field 12, a date field 14, a check number field 16 located in the upper-right corner of the check 10, a payee field 18, a courtesy amount field 20, a legal amount field 22, a paying bank name field 24, a memo field 26, a payer signature field 28, and a magnetic ink character recognition (MICR) codeline field 29.

Figure 2:
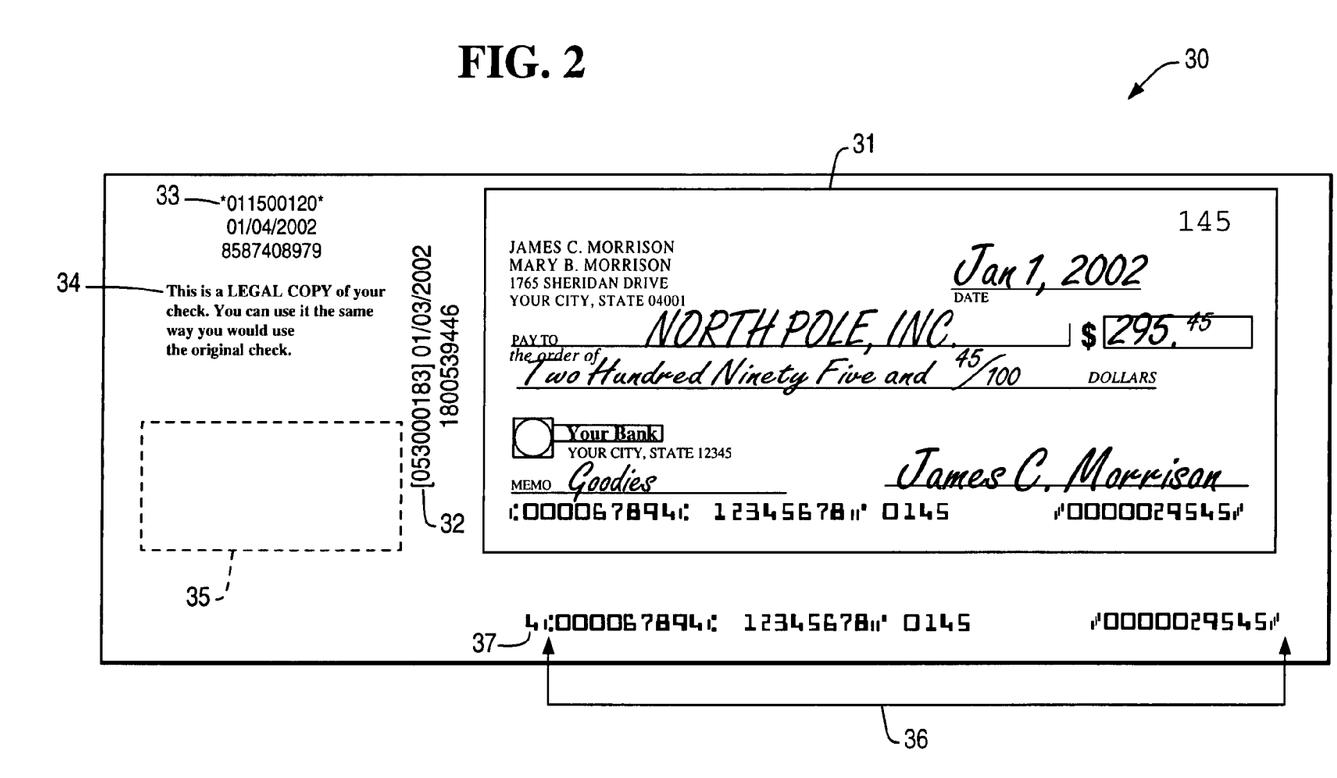
FIG. 2 is an illustration of the front side of an original image replacement document (IRD) for the original check of FIG. 1.
Figure 3:
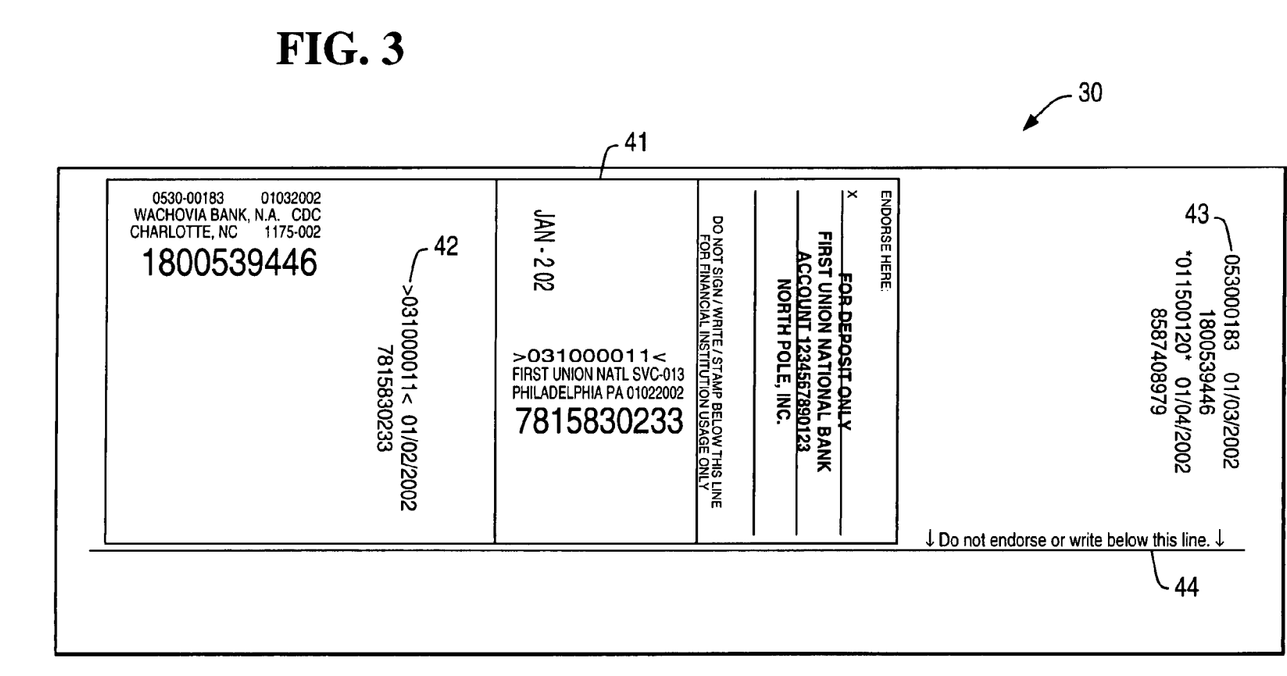
FIG. 3 is an illustration of the back side of the original IRD of FIG. 2.

Referring to FIGS. 2 and 3, the front side (FIG. 2) of an original IRD 30 of the check 10 and the backside (FIG. 3) of the original IRD are illustrated. The front side of the original IRD 30 includes an original scanned front image 31 of the check 10. The front side of the original IRD 30 also includes an endorsement 32 of the bank which captured the image of the check 10 to provide the front image 31. The bank which captured the front image 31 of the check 10 may or may not be the bank of first deposit.

The front side of the original IRD 30 further includes an endorsement 33 of the bank which created the original IRD. This endorsement 33 includes three elements which are (i) the routing transit number "011500120" associated with the original IRD 30, (ii) the date of creation of the original IRD (i.e., "Jan. 4, 2002"), and (iii) the sequence number "8587408979" associated with the original IRD. The two asterisks enclosing the routing transit number are used to indicate that this is the bank which created the original IRD 30, as defined by the ANSI X9.90 standard. The front side of the original IRD 30 also includes a text overlay 34 which identifies the original IRD as being a legal copy of the check 10. Also included is an optional information area 35, as defined by the ANSI X9.90 standard, for placing optional information.

The front side of the original IRD 30 also includes a MICR codeline 36 from the check 10 which has been encoded. This MICR codeline 36 is printed with ink which contains magnetic properties (referred to herein as "magnetic ink") and is the same as the MICR codeline contained in the front image 31 of the check 10. Also included is an IRD identification 37 adjacent to the MICR codeline 36, in the position as shown in FIG. 2. The IRD identification 37 is referred to as an "electronic processing code (EPC) digit" as defined by the ANSI X9.90 standard. The IRD identification 37 is also printed with magnetic ink.

As shown in FIG. 3, the back side of the original IRD 30 includes an original scanned back image 41 of the check 10. The back side of the original IRD 30 also includes an initial bank of first deposit (BOFD) endorsement overlay 42. An overlay 43 of any subsequent endorsements, and a line/text overlay 44 which requests that no writings be made below the line are also included.

Figure 4:
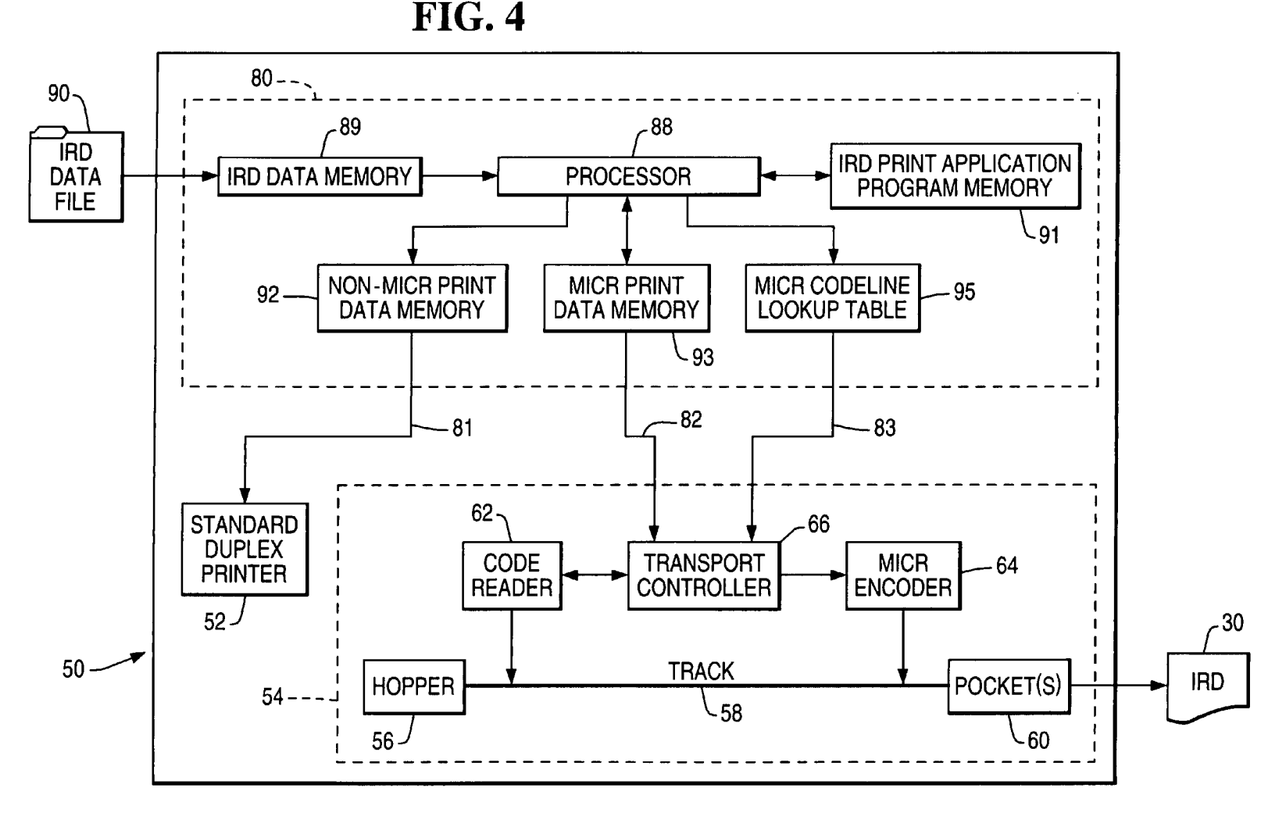
FIG. 4 is a schematic block representation of an apparatus constructed in accordance with the present invention.

Referring to FIG. 4, a schematic block representation of an apparatus 50 constructed in accordance with the present invention is illustrated. The apparatus 50 includes a standard duplex printer 52 which may be a commercially-available, off-the-shelf type of duplex printer which has the capability to print graphical images on both the front and rear sides of sheet material suitable for printing IRDs. The printer 52 uses an ink without any magnetic properties (referred to herein as "non-magnetic ink") to print alphanumeric text including graphics onto the front side of the sheet material. Similarly, the printer 52 uses non-magnetic ink to print alphanumeric text including graphics onto the back side of the sheet material.

The apparatus 50 further includes a commercially-available item encoding transport 54, such as the Model iTRAN 8000 Item Processing System, manufactured by NCR Corporation, located in Dayton, Ohio. Typically, the transport 54 includes a document hopper 56 in which documents items are stacked. The transport 54 also includes a document track 58 along which document items in the document hopper 56 are transported from the document hopper to a number of pockets 60 located at the downstream end of the document track. A code reader 62 is disposed along the document track 58. The code reader 62 may be, for example, an optical character reader which reads optically readable characters on a document item which is being transported along the document track 58. As another example, the code reader 62 may be of the type capable of reading symbolic font, such as Universal Product Codes used on groceries.

A MICR encoder 64 is also disposed along the document track 58. The MICR encoder 64 is preferably of the type which prints a single MICR codeline onto the front side of the document item being transported along the document track 58. The MICR encoder 64 uses magnetic ink to print the MICR codeline onto the front side of the document item which is being transported along the document track 58. The MICR encoder 64 prints the MICR codeline on the document item at a location which is typically just above the bottom edge of the front side of the document item. A transport controller 66 controls the code reader 62 and the MICR encoder 64.

The apparatus 50 further includes a print controller 80 which provides data on lines 81, 82, 83 to the duplex printer 52 and the encoding transport 54 to enable an IRD to be created in two printing passes. The first printing pass is through the duplex printer 52. The second printing pass is through the encoding transport 54.

The print controller 80 includes a processor 88 for processing IRD data retrieved from memory 89 which, in turn, receives IRD data contained in an IRD data file 90 from an external application. The external application may be any type of application in which an IRD is desired. The processor 88 processes the retrieved IRD data based upon an IRD printing control application program which is stored in memory 91. The IRD data is processed to provide non-MICR print files which are stored in memory 92 and MICR print files which are stored in memory 93. Also, the retrieved IRD data is processed to provide a MICR codeline data which is stored in a MICR codeline lookup table 95. The generation of the non-MICR print files, the MICR print files, and the MICR codeline data are further described hereinbelow.

Figure 5:
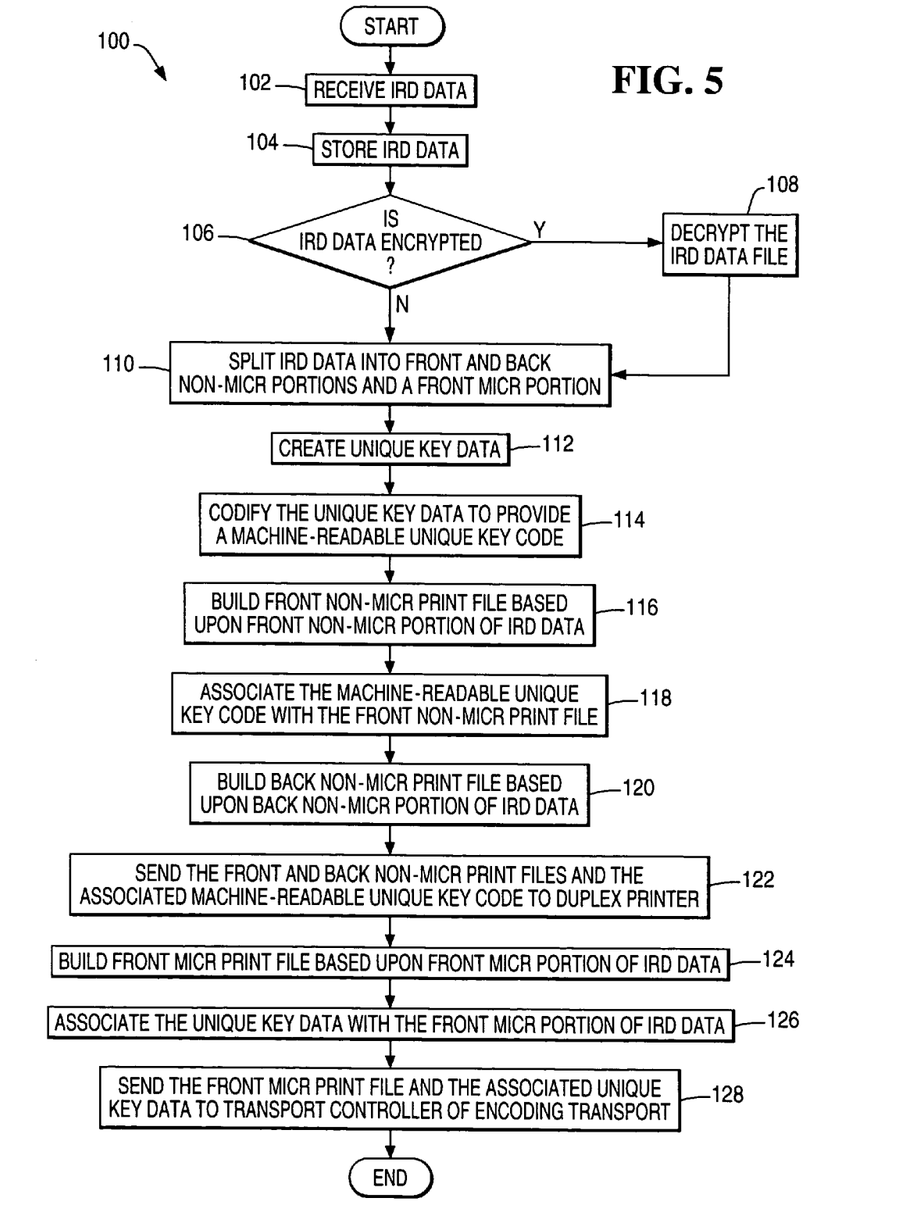
FIGS. 5–7 are flowcharts depicting programs for creating an original IRD in accordance with the present invention.

Referring to FIG. 5, a flowchart 100 depicts the IRD printing control application program for providing the print files and the MICR codeline data for use in creating an original IRD in accordance with the present invention. After receiving the IRD data in step 102 and storing the IRD data in memory 89 in step 104, a determination is made in step 106 as to whether the IRD data is encrypted. If the determination in step 106 is negative, the program proceeds directly to step 110. However if the determination in step 106 is negative, the IRD data is decrypted in step 108 before proceeding to step 110.

In step 110, the IRD data (or, if applicable, the decrypted version thereof) is split into a front non-MICR portion, a back non-MICR portion, and a front MICR portion. In step 112, unique key data is created for associating with the front non-MICR portion of the IRD data and the front MICR portion of the IRD data. More specifically, in step 114, the data which is representative of the unique key is codified to provide a machine-readable representation of the unique key. For example, the data which is representative of the unique key may be codified into a barcode. In step 116, a front non-MICR print file is built based upon the front non-MICR portion of the IRD data. The front non-MICR print file is representative of non-MICR portions to be printed onto the front of the IRD (such as the non-MICR areas shown in FIG. 2). As shown in step 118, the machine-readable unique key code is associated with the front non-MICR print file. Similarly, a back non-MICR print file is built based upon the back non-MICR portion of the IRD data. The back non-MICR print file is representative of non-MICR portions to be printed onto the back of the IRD (such as the non-MICR areas shown in FIG. 3). Then, in step 122, the front and back non-MICR print files which were created in steps 116, 120 and the machine-readable unique code key code which was associated with the front non-MICR print file in step 118 are sent to the duplex printer 52.

In step 124, a front MICR print file is built based upon the front MICR portion of the IRD data. Then, in step 126, the unique key data which was created in step 112 is associated with the front MICR print file built in step 124. As shown in step 128, the front MICR print file which was built in step 124 is sent to the transport controller 66 of the encoding transport 54.

Figure 6:
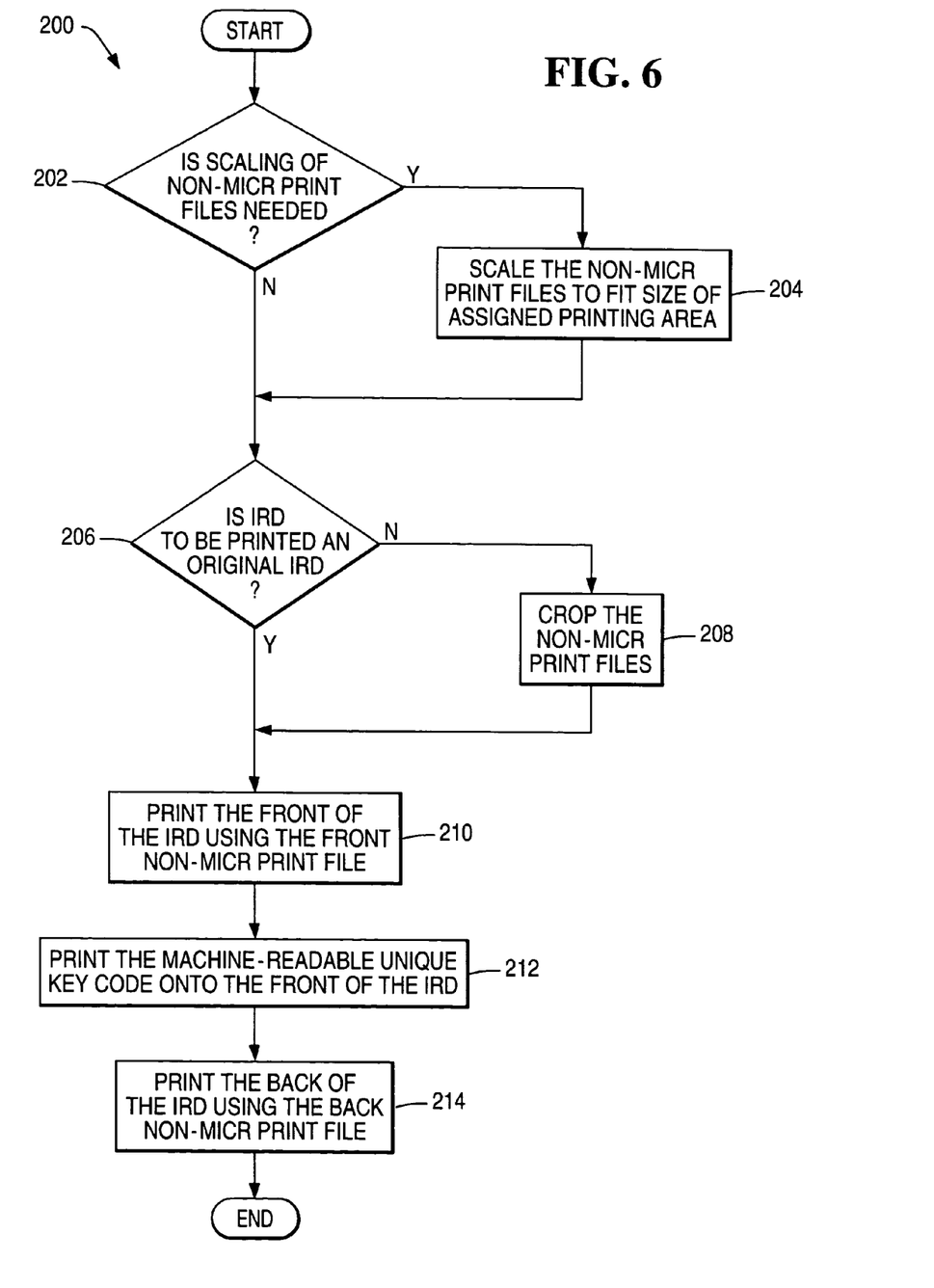

Referring to FIG. 6, a flowchart 200 depicts a first printing pass application program which is used by the duplex printer 52 during a first pass of a two-pass process in creating an IRD. In step 202, a determination is made as to whether either of the non-MICR print file which were built in steps 116, 120 of FIG. 5 need to be scaled. Scaling may be needed so that an assigned printing area, as defined by the ANSI X9.90 standard, can accommodate all of the non-MICR print files which were built in steps 116, 120. If the determination in step 202 is negative, the program proceeds directly to step 206. However, if the determination in step 202 is affirmative, the program proceeds to step 204 to scale the non-MICR print files which were built in steps 116, 120 of FIG. 5 to fit the size of the assigned printing area before proceeding to step 206.

In step 206, a determination is made as to whether the IRD to be printed is an original IRD. If the determination in step 206 is affirmative, the program proceeds directly to step 210. However, if the determination in step 206 is negative (i.e., the IRD to be printed is not an original IRD but is a substitute IRD), the program proceeds to step 208 to crop the non-MICR print files before proceeding to step 210. The non-MICR print files are cropped to avoid further scaling of the non-MICR print files.

In step 210, the duplex printer 52 prints the non-MICR portion of the front of the IRD being created using the front non-MICR print file. Also, as shown in step 212, the machine-readable unique key code which was provided in step 114 of FIG. 5 is printed on the front of the IRD being created. In step 130, the printer 52 prints the non-MICR portion of the back of the IRD being created using the back non-MICR print file.

After a first printing pass through the duplex printer 52, the physical document item which now has the non-MICR portion printed on the front, the machine-readable unique key code also printed on the front, and the non-MICR portion printed on the back is physically transported from the printer 52 to the encoding transport 54. The physical document item is transported to the encoding transport 54 to run the document item in a second printing pass through the encoding transport 54 to print the MICR portion onto the front of the document item. Typically, this document item is transported along with other document items which are also intended for running through the encoding transport 54 to print the MICR portion onto their respective fronts. The document items are usually in a stack and placed as a stack of document items into the document hopper 56 of the encoding transport 54.

Figure 7:
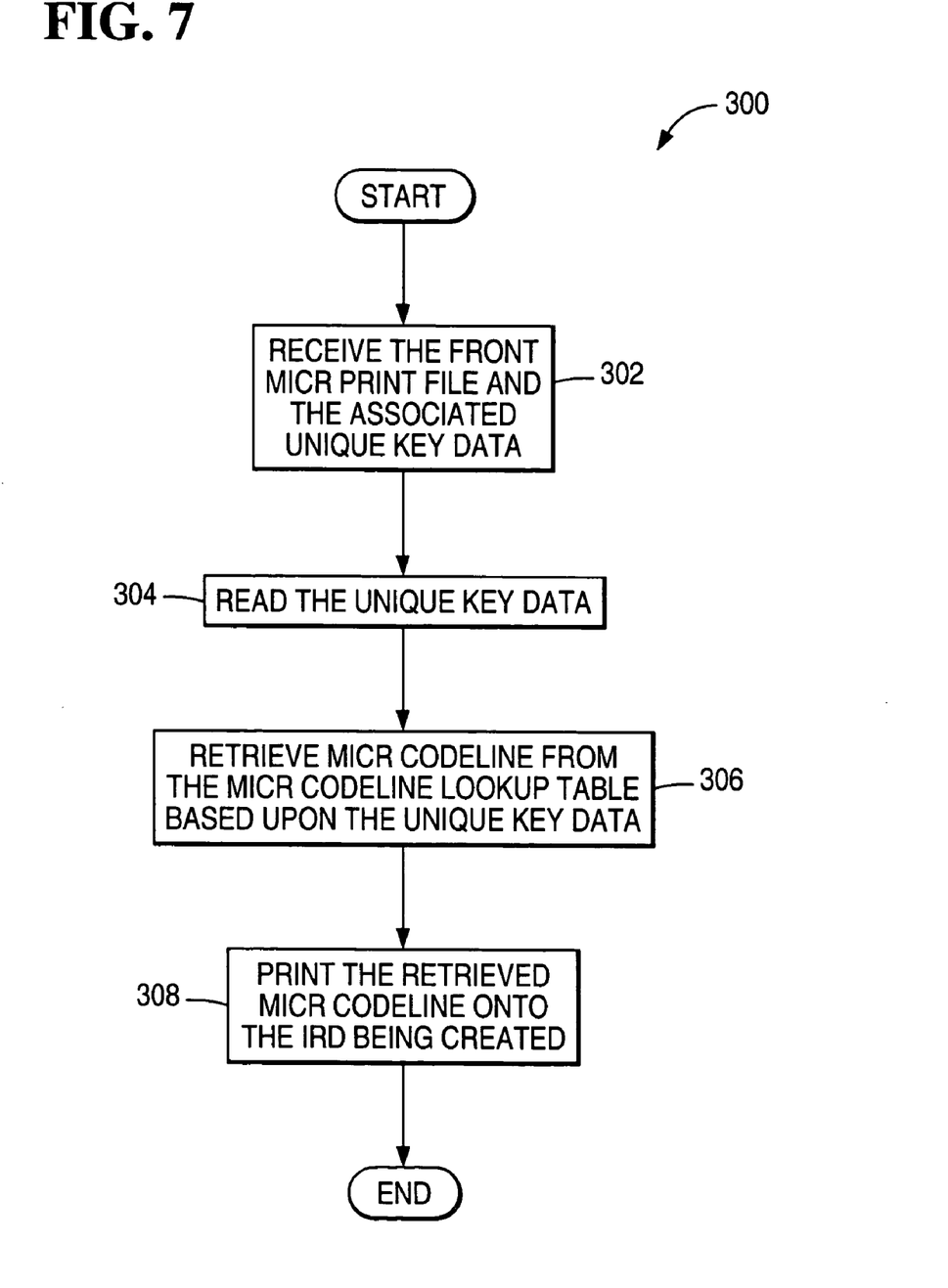

Referring to FIG. 7, a flowchart 300 depicts a second pass printing application program which is used by the encoding transport 54 during the second pass of the two-pass process in creating the IRD. In step 302, the transport controller 66 receives the front MICR print file and the associated unique key data which was associated in step 124 of FIG. 5 from the print controller 80. In step 304, the unique key data is read. Then, in step 306, a MICR codeline is retrieved from the MICR codeline lookup table 95 (FIG. 4) based upon the unique key data which was read in step 304. In step 308, the retrieved MICR codeline is then printed onto the front of the IRD being created, resulting in the IRD 30 as shown in FIG. 4.

It should be apparent that existing devices which are usually readily available within a financial institution are being used to create an IRD. These existing devices include a standard duplex printer, and a standard item processing transport which has MICR encoding capability. The typical MICR encoding capability of a standard item processing transport provides a MICR codeline with a relatively minimal amount of residual magnetic ink being deposited on the IRD. This is due to the relatively high technical precision of a typical MICR encoder used in a standard item processing transport. It should also be apparent that non-MICR portions of the IRD are not printed using magnetic ink which is more expensive than non-magnetic ink. The results are reduced material costs as well as reduced overhead costs.

Although the above description describes using print files to create an IRD, it is conceivable that other data formats may be used to create an IRD. It is contemplated that some IRD data may be received from an external application and some IRD data be generated within the apparatus 50.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of creating an image replacement document (IRD) during first and second passes of a sheet material through a printing apparatus, the method comprising:
building a first print file portion based upon IRD data;
building a second print file portion based upon IRD data;
during the first pass of the sheet material through the printing apparatus, printing with non-magnetic ink onto the sheet material at least some information based upon the first print file portion to create a front portion of the IRD;
during the first pass of the sheet material through the printing apparatus, printing with non-magnetic ink onto the sheet material at least some information based upon the second print file portion to create a back portion of the IRD;
during the first pass of the sheet material through the printing apparatus, printing with non-magnetic ink onto the sheet material a machine-readable code which is associated with corresponding magnetic ink character recognition (MICR) codeline data stored in memory;
during the second pass of the sheet material through the printing apparatus, reading the machine-readable code which has been printed onto the sheet material in the first pass;
during the second pass of the sheet material through the printing apparatus, retrieving from memory the stored corresponding MICR codeline data which is associated with the machine-readable code which has been read from the sheet material; and
during the second pass of the sheet material through the printing apparatus, printing with magnetic ink onto the sheet material an encoded MICR codeline which is represented by the retrieved MICR codeline data.

2. A method according to claim 1, wherein the encoded MICR codeline is printed with magnetic ink onto the front portion of the IRD during the second pass of the sheet material through the printing apparatus.

3. A method according to claim 1, wherein the machine-readable code comprises a barcode.

4. A method according to claim 1, wherein the IRD data is received from an application external to the printing apparatus.

5. A method according to claim 1, wherein the first and second print files comprise a single file.

6. An apparatus for creating an image replacement document (IRD) during first and second passes of a sheet material, the apparatus comprising:
means for building a first print file portion based upon IRD data;
means for building a second print file portion based upon IRD data;
means for, during the first pass of the sheet material, (i) printing with non-magnetic ink onto the sheet material at least some information based upon the first print file portion to create a front portion of the IRD, (ii) printing with non-magnetic ink onto the sheet material at least some information based upon the second print file portion to create a back portion of the IRD, and (iii) printing with non-magnetic ink onto the sheet material a machine-readable code which is associated with corresponding magnetic ink character recognition (MICR) codeline data stored in memory; and
means for, during the second pass of the sheet material, (i) reading the machine-readable code which has been printed onto the sheet material in the first pass, (ii) retrieving from memory the stored corresponding MICR codeline data which is associated with the machine-readable code which has been read from the sheet material, and (iii) printing with magnetic ink onto the sheet material an encoded MICR codeline which is represented by the retrieved MICR codeline data.

7. An apparatus according to claim 6, wherein the encoded MICR codeline is printed with magnetic ink onto the front portion of the IRD during the second pass of the sheet material.

8. An apparatus according to claim 6, wherein the machine-readable code comprises a barcode.

* * * * *